United States Patent
Griffin et al.

(10) Patent No.: US 12,387,123 B2
(45) Date of Patent: Aug. 12, 2025

(54) DYNAMICALLY ADJUSTING BIASES ON QUANTUM BITS BASED ON DETECTED EVENTS

(71) Applicant: RED HAT, INC., Raleigh, NC (US)

(72) Inventors: Leigh Griffin, Waterford (IE); Stephen Coady, Waterford (IE)

(73) Assignee: Red Hat, Inc., Raleigh, NC (US)

( * ) Notice: Subject to any disclaimer, the term of this patent is extended or adjusted under 35 U.S.C. 154(b) by 704 days.

(21) Appl. No.: 17/730,488

(22) Filed: Apr. 27, 2022

(65) Prior Publication Data
US 2023/0351239 A1      Nov. 2, 2023

(51) Int. Cl.
*G06N 10/40* (2022.01)
*G06N 10/80* (2022.01)

(52) U.S. Cl.
CPC ............ *G06N 10/40* (2022.01); *G06N 10/80* (2022.01)

(58) Field of Classification Search
CPC .............................. G06N 10/40; G06N 10/80
USPC ......................................................... 716/100
See application file for complete search history.

(56) References Cited

U.S. PATENT DOCUMENTS

| | | | | |
|---|---|---|---|---|
| 11,087,232 B2 * | 8/2021 | Ducore | .................... | G06F 15/80 |
| 11,900,264 B2 * | 2/2024 | McGeoch | ................. | G06N 5/01 |
| 2018/0260245 A1 * | 9/2018 | Smith | .................... | G06F 9/4881 |
| 2020/0387821 A1 | 12/2020 | Griffin et al. | | |
| 2021/0334128 A1 * | 10/2021 | Zeng | ...................... | G06N 10/20 |
| 2021/0342289 A1 | 11/2021 | Maassen van den Brink et al. | | |
| 2023/0139281 A1 * | 5/2023 | Coady | .................... | G06N 10/00 716/100 |
| 2024/0062091 A1 * | 2/2024 | Brown | .................... | G06N 10/00 |
| 2024/0378085 A1 * | 11/2024 | Ravi | ...................... | G06N 10/80 |

FOREIGN PATENT DOCUMENTS

| | | | | |
|---|---|---|---|---|
| CN | 113760039 A | * | 12/2021 | ............. G06F 1/022 |
| WO | WO-2024102180 A2 | * | 5/2024 | ............. G06F 15/78 |

OTHER PUBLICATIONS

Extended European Search Report of Application No. 22192335.2 (20211382EP) dated Jul. 12, 2023: pp. 1-7.
Aliabadi et al., "Chaos synchronization using adaptive quantum neural networks and its application in secure communication and cryptography," Neural Computing and Applications, vol. 34(8), Apr. 1, 2022 (published online Jan. 18, 2022): pp. 6521-6533.
Xi et al., "An Adaptive Parameter Control Scheme of Core Devices in DV-QKD," 2019 IEEE 19th International Conference on Communication Technology, Oct. 16, 2019: pp. 1209-1213.

* cited by examiner

*Primary Examiner* — Suresh Memula
(74) *Attorney, Agent, or Firm* — Kilpatrick Townsend & Stockton LLP

(57) ABSTRACT

Biases on quantum bits can be dynamically adjusted based on events. For example, a system can detect an event related to a service executing in a computing environment. The service can rely on a state of a quantum bit of a quantum computing subsystem in performing a computing operation. The system can determine an amount of bias to apply to the quantum bit based on the event. The amount of bias can be configured to modify a result of the computing operation. The system can transmit a control signal configured to cause the quantum computing subsystem to apply the amount of bias to the quantum bit (e.g., while the service is executing).

20 Claims, 5 Drawing Sheets

DYNAMICALLY ADJUSTING BIASES ON QUANTUM BITS BASED ON DETECTED EVENTS

TECHNICAL FIELD

The present disclosure relates generally to quantum computing. More specifically, but not by way of limitation, this disclosure relates to dynamically adjusting biases on quantum bits based on detected events.

BACKGROUND

Quantum computing subsystems harness quantum mechanics to provide significant advances in computation to solve problems. The main building block of a quantum computing subsystem is a quantum bit (or "qubit"). Quantum bits serve as the basic unit of information in quantum computing subsystems, much like how binary bits serve as the basic unit of information in classical computers. Common types of quantum bits include charge qubits and flux qubits.

A single quantum bit can have two or more discrete energy states, which are often referred to as basis states. The state of a quantum bit at a given instant in time can be any superposition of two basis states, which means that a quantum bit can be in the two basis states at the same time. This is fundamentally different from how a conventional binary bit operates on a classical computer, whereby the bit can only be in a single state (a 0 state or a 1 state) at a given instant in time.

Quantum bits are often used to perform quantum computations. To complete a quantum computation using a quantum bit, the state of the quantum bit is typically measured (e.g., read out). Due to certain physical phenomena, the quantum nature of a quantum bit may be temporarily lost during the measurement process, causing the superposition of the two basis states to collapse into either one basis state or the other.

DETAILED DESCRIPTION

Figure 1:
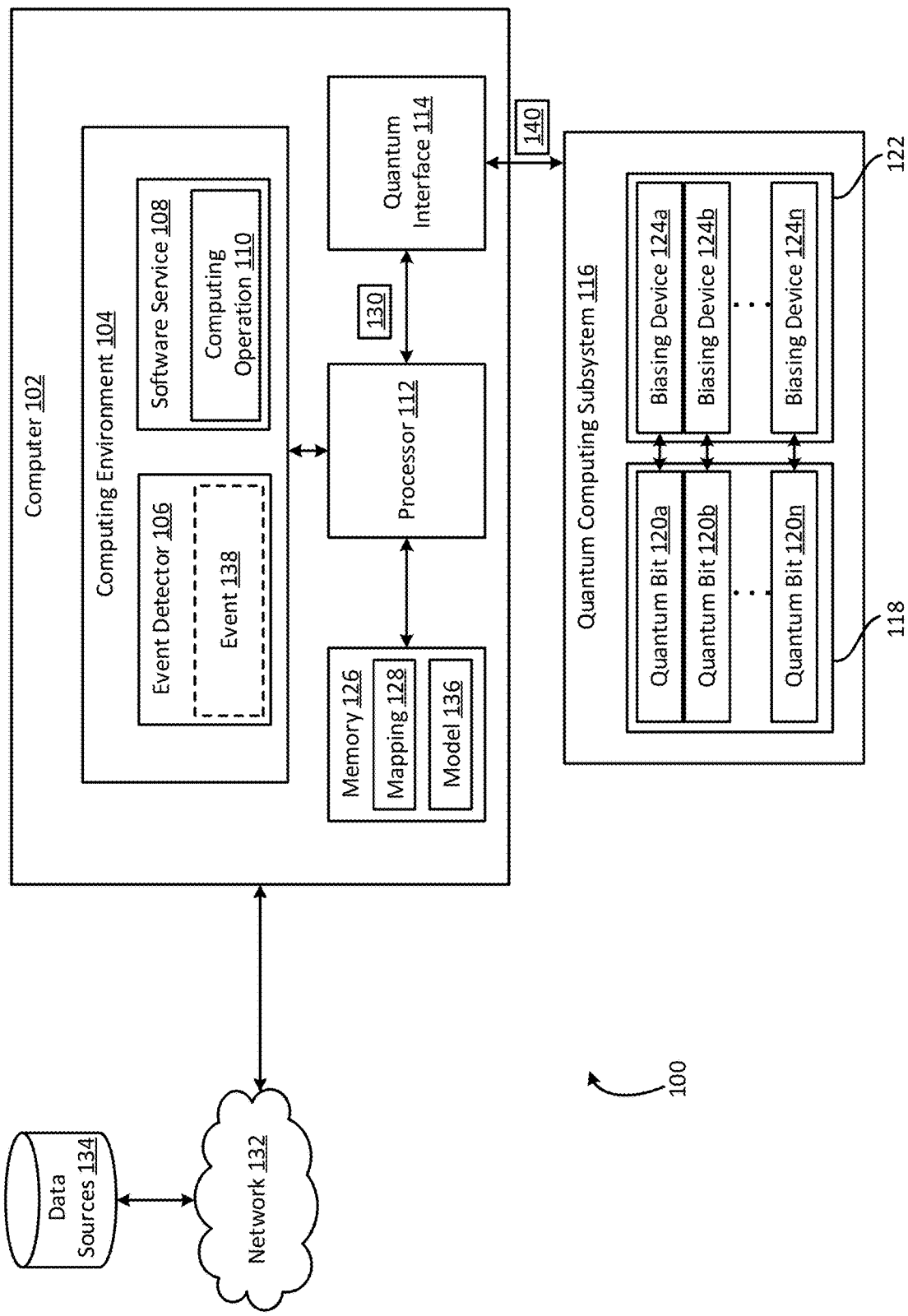
FIG. 1 is a block diagram of an example of a system for dynamically adjusting biases on quantum bits based on detected events according to some aspects of the present disclosure.

A quantum computing system can include quantum bits that may serve as the basic unit of information within the quantum computing system. The states (e.g., basis states) of the quantum bits may be set in specific ways to configure the quantum computing system. Conventionally, the states of the quantum bits are preset and remain relatively fixed during the lifetime of a software service executed by the quantum computing system. For example, a quantum computing system may execute a software service to perform operations. Examples of the software service can include a microservice, serverless function, or application. Prior to executing the software service, the states of the quantum bits may be set in a particular way to configure the quantum computing system. And the states of the quantum bits may remain relatively fixed while the software service executes. The reason that the states of the quantum bits are typically kept constant during the software service's runtime is so that computing operations performed by the software service yield consistent results. Modifying the states during runtime can lead to inconsistent results, for example if the same computing operation is executed twice based on the same inputs. But there are some circumstances where modifying the quantum bit's states during runtime may be desirable, for example to guide a computing operation's result toward or away from a target value. And convention quantum computing systems lack the flexibility to do so.

Some examples of the present disclosure can overcome one or more of the abovementioned problems by dynamically adjusting biases on quantum bits in response to detecting events related to a software service, so as to influence a result of a computing operation implemented by the software service at runtime. More specifically, a computer can include a software service that is configured to execute a computing operation. A result of the computing operation can depend on a state of a quantum bit of a quantum computing subsystem. During the runtime of the software service, the computer can detect one or more events that relate to the computing operation. In response to detecting such events, the computer can interact with the quantum computing subsystem to adjust a bias on the quantum bit in a way that modifies a future result of the computing operation. Different events may lead to different adjustments to the bias, thereby causing the computing operation to produce different results in response to different events. In this way, the computer can dynamically adjust the bias on the quantum bit during the runtime of the software service to influence the results of the computing operation.

In some examples, the computer can determine how to adjust the bias on the quantum bit based on a predefined mapping. The predefined mapping may include relationships between preselected events and bias amounts or adjustments. The computer can access the predefined mapping to determine an amount of bias that is correlated to a detected event. The computer can then interact with the quantum computing subsystem to adjust the bias on the quantum bit based on (e.g., to match) the amount of bias defined in the mapping. Because the computing operation of the software service can depend on the state of the quantum bit, adjusting the bias on the quantum bit may affect a subsequent result of the computing operation.

In other examples, the computer can determine how to adjust the bias on the quantum bit based on a model. The model may be a machine-learning model, such as a neural network, classifier, or support vector machine. The model can be configured to receive event data as input and generate an output indicating a bias amount or adjustment. The computer can supply event data associated with a detected event as input to the model and receive as output from the model an amount of bias to apply to a quantum bit. The computer can then interact with the quantum computing subsystem to adjust the bias on the quantum bit based on the amount of bias indicated by the model. Because the computing operation of the software service can depend on the state of the quantum bit, adjusting the bias on the quantum bit may affect a subsequent result of the computing operation.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is a block diagram of an example of a system 100 for dynamically adjusting biases on quantum bits in response to detecting events according to some aspects of the present disclosure. The system 100 can include a computer 102, such as a laptop computer, desktop computer, or server. The computer 102 can include a computing environment 104 for running one or more software services, such as software service 108. Examples of the software service 108 can include a gaming application, a navigation application, a word-processing application, a data-processing application, etc. The software service 108 may be any suitable type of software program, such as a microservice, a serverless function, or an application.

The computer 102 can also include various hardware. For example, the computer 102 can include a processor 112 communicatively coupled to a memory 126. The processor 112 can include one processing device or multiple processing devices. Non-limiting examples of the processor 112 include a Field-Programmable Gate Array (FPGA), an application-specific integrated circuit (ASIC), a microprocessor, etc. The processor 112 can execute instructions stored in the memory 126 to perform the operations. In some examples, the instructions can include processor-specific instructions generated by a compiler or an interpreter from code written in any suitable computer-programming language, such as C, C++, C #, etc.

Memory 126 can include one memory device or multiple memory devices. The memory 126 can be non-volatile and may include any type of memory device that retains stored information when powered off. Non-limiting examples of the memory 126 include electrically erasable and programmable read-only memory (EEPROM), flash memory, or any other type of non-volatile memory. At least some of the memory 126 can include a non-transitory computer-readable medium from which the processor 112 can read instructions. A computer-readable medium can include electronic, optical, magnetic, or other storage devices capable of providing the processor 112 with computer-readable instructions or other program code. Examples of a computer-readable medium can include magnetic disks, memory chips, ROM, random-access memory RAM, an ASIC, a configured processor, optical storage, or any other medium from which a computer processor can read instructions.

The processor 112 can also be communicatively coupled to a quantum interface 114 for interfacing with a quantum computing subsystem 116. The quantum interface 114 can include hardware, software, firmware, or any combination thereof for interacting with the quantum computing subsystem 116. The quantum interface 114 may receive control signals 130 from the processor 112 and operate the quantum computing subsystem 116 based on the control signals 130.

The quantum computing subsystem 116 can include a group 118 of quantum bits 120a-n. The group 118 can include any number and combination of quantum bits 120a-n. In some cases, the group 118 can include thousands of quantum bits 120a-n. The quantum bits 120a-n may be superconducting quantum bits, in some examples.

The quantum computing subsystem 116 can also include a biasing circuit 122 associated with the quantum bits 120a-n. The biasing circuit 122 is hardware for applying one or more biases to one or more of the quantum bits 120a-n. The biases can influence the states of the quantum bits 120a-n. Examples of the biases can include a magnetic field or an electric charge configured to influence the state of a corresponding quantum bit.

To generate the biases, the biasing circuit 122 can include one or more biasing devices 124a-n. The biasing devices 124a-n are hardware configured to apply the biases to the quantum bits 120a-n. The biasing devices 124a-n may include electrical circuit components for generating the biases. In the example shown in FIG. 1, each of the quantum bits 120a-n has a corresponding biasing device 124a-n that is configured to apply a bias to that quantum bit. The bias is depicted in FIG. 1 as a double-headed arrow between the biasing device and the quantum bit. But in other examples, the biasing circuit 122 may be configured in other ways. For example, multiple quantum bits 120a-b may share a single biasing device 124a, where that biasing device 124a can apply one or more biases to the multiple quantum bits 120a-b sequentially or concurrently.

The biasing devices 124a-n can made of any suitable hardware components that may be programmatically controlled. For example, a biasing device 124a can include a loop of metal in proximity to a quantum bit 120a to generate a magnetic field on the quantum bit 120a. The loop of metal may include a Josephson junction. The characteristics of the magnetic field can depend on the properties (e.g., magnitude, frequency, and phase) of the current supplied to the loop, where the current properties can be programmatically controlled. The current properties may be programmatically controlled by the processor 112 of the computer 102 or by any other suitable hardware, such as a control system that is internal to the quantum computing subsystem 116. In this way, each of the biasing devices 124a-n can be individually and programmatically controlled to apply a certain amount of bias on at least one corresponding quantum bit. Applying the bias to the quantum bit can influence the state of the quantum bit, for example by causing the quantum bit to have a higher probability of being in a target basis state or landing in the target basis state subsequent to a readout operation.

In some examples, the computer 102 may include an event detector 106. The event detector 106 may be software configured for detecting events that are associated with the software service 108. The event detector 106 can detect the events based on information from one or more data sources 134, such as websites, RSS feeds, file servers, video or audio streams, sensors, or any combination of these. The event detector 106 may receive the information from the data sources 134 via one or more networks 132, such as a local area network or the Internet. The event detector 106 can then analyze (e.g., parse) the information to detect the events.

The events can include any type of events occurring internally or externally to the service 108 that may impact the operation of the software service 108. In some examples, the events may originate from the software service 108. For instance, the events can include program events triggered by the software service 108. Examples of such program events can include errors, the execution or completion of certain program functions, or the generation of certain outputs. In other examples, the events may originate outside the software service 108 and may occur independently of the software service 108. For instance, the events may be virtual events occurring elsewhere within the computing environment 104 or elsewhere in digital space (e.g., within another computing environment that is external to the computer 102). Examples of such virtual events may include cybersecurity events, stock market events, video game events, and social media events. In some examples, the events may include physical events occurring in the real space (the real world), such as news events or sensed events. Examples of news events can include sporting events, vehicle accidents, weather events, and corporate events. Examples of sensed events can be events detected based on sensor signals from one or more sensors, such as thermometers, gyroscopes, accelerometers, inclinometers, cameras, microphones, or any combination of these.

In some examples, the processor 112 can execute the event detector 106 to detect an event 138. Although the event 138 is depicted in FIG. 1 as being internal to the event detector 106, this is merely meant to symbolize that the event detector 106 detected the event 138, rather than that the event 138 originated from the event detector 106. The event detector 106 can detect the event 138 while the software service 108 is running. In some examples, the event 138 may be related to a computing operation 110 that is currently being performed by the software service 108. Alternatively, the event 138 may be related to a computing operation 110 that will be performed by the software service 108 in the future.

The computing operation 110 may be any suitable computing operation that relies on one or more of the quantum bits 120a-n in generating a result. In particular, the computing operation 110 may be configured to generate a certain result based on the basis states of the quantum bits 120a-n. For example, the software service 108 can be a navigation service and the computing operation 110 may be a navigation operation for determining a driving route from a starting location to a destination location. Part of the process for determining the driving route may involve a computation that relies upon one or more basis states of one or more quantum bits 120a-n. As another example, the software service 108 can be an access control service and the computing operation 110 may be an access control operation for controlling access to a resource, such as a virtual resource or a physical resource. Examples of the virtual resource may be a secure file or a secure server. Examples of the physical resource may be a secure object or a secure physical location. Part of the process for determining whether access is to be granted to the resource may involve a computation that relies upon one or more basis states of one or more quantum bits 120a-n.

In response to detecting the event 138, the processor 112 can determine how to adjust one or more biases on one or more of the quantum bits 120a-n that are relied upon by the computing operation 110. Adjusting the biases can influence the computing operation 110 in such a way that the computing operation 110 is more likely to achieve a target result. The specific quantum bits that are to be impacted, and the amount of bias to be applied to those quantum bits, can be determined based on the detected event 138. For example, the processor 112 can access a mapping 128, which may be predefined, to determine bias amounts to apply in response to detecting events.

In some examples, the mapping 128 can be service-specific or domain-specific. For example, the computer 102 may have access to multiple mappings, where each mapping is designed to be used with a corresponding software service. The mapping 128 may be specifically designed for use with the software service 108, and other software services may have their own respective mappings. Such mappings may be created by the developers of the software services or other developers more familiar with quantum mechanics.

Figure 2:
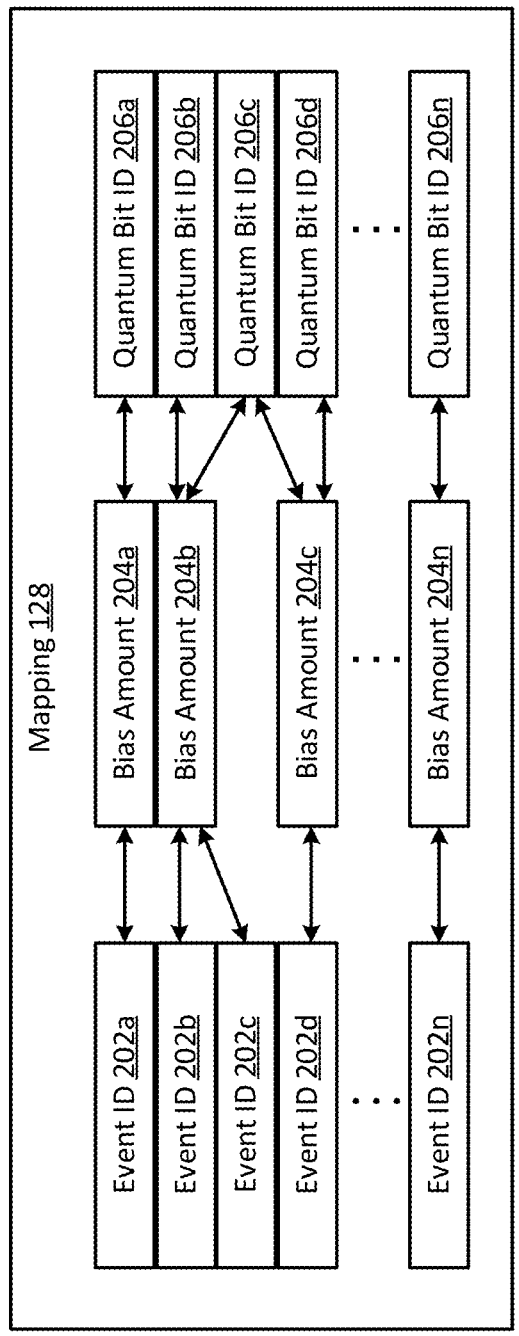
FIG. 2 is a block diagram of an example of a predefined mapping according to some aspects of the present disclosure.

One example of the mapping 128 is shown in FIG. 2. As shown, the mapping 128 can include relationships between events, bias amounts or adjustments 204a-n, and quantum bits. The events can be represented in the mapping 128 using event identifiers 202a-n. The quantum bits can be represented in the mapping 128 using quantum bit identifiers 206a-n. As shown, there can be one-to-one or one-to-many relationships between events, bias amounts, quantum bits, or any combination of these. Based on the mapping 128, the processor 112 can determine which bias adjustments are to be made to which quantum bits based on the detected event 138. For example, the detected event 138 may correspond to event identifier 202a. So, the processor 112 can use a first correlation in the mapping 128 between event identifier 202a and bias amount 204a to determine that the bias amount 204a is to be applied to one or more quantum bits in response to detecting the event 138. The processor 112 can also use a second correlation in the mapping 128 between the bias amount 204a and the quantum bit identifier 206a to determine that the bias amount 204a is to be applied to the particular quantum bit 120a associated with the quantum bit identifier 206a.

Referring back to FIG. 1, the processor 112 can additionally or alternatively determine the bias amounts to apply and the corresponding quantum bits in other ways. For example, the processor 112 can execute a model 136, such as a machine-learning model. Examples of a machine-learning model can include a neural network, a classifier, or a support vector machine. The model 136 can be configured to receive inputs and generate an output indicating one or more bias amounts and one or more quantum bits to which the one or more bias amounts are to be applied. In some examples, the inputs can include event data characterizing the detected event 138. The output from the model 136 can indicate bias amounts and corresponding quantum bits based on the event data.

The model 136 may be trained prior to usage. A supervised or unsupervised training process may be used to train the model 136. The model 136 may be trained using any suitable training data. In some examples, the training data may include relationships between the states of one or more quantum bits 120a-b, bias amounts applied to the one or more quantum bits by the biasing devices 125a-n, and outputs of the computing operation 110. For instance, the training data may include thousands or millions of entries, where each entry includes one or more states of one or more quantum bits 120a-b at a given instant in time, one or more bias amounts applied to the one or more quantum bits at that instant in time, and an output of the computing operation 110. From the training data, the model 136 may learn how different biases impact the states of the quantum bits and how the states of the quantum bits impact the output of the computing operation 110. Once trained, the model 136 may be able to estimate how to adjust the biases applied to certain quantum bits to yield a desired result from the computing operation 110. The model 136 may provide this information as output, which the processor 112 can use to configure the biases on the quantum bits 120a-n in a way that is more likely to achieve the desired result.

Having determined the bias amounts to apply and the corresponding quantum bits, the processor 112 can next generate one or more control signals 130 based on the determined bias amounts and the determined quantum bits. The control signals 130 can be configured to cause the quantum computing subsystem 116 to apply the determined bias amounts to the determined quantum bits. For example, the processor 112 can transmit the control signals 130 to the quantum interface 114, which can receive the control signals 130 and responsively operate the biasing circuit 122 such that the biasing circuit 122 applies the determined bias amounts to the determined quantum bits. This may involve the quantum interface 114 generating and transmitting secondary control signals 140 to the quantum computing subsystem 116 based on the control signals 130 from the processor 112. The secondary control signals 140 may cause the biasing circuit 122 (e.g., one or more biasing devices therein) to apply the determined bias amounts to the determined quantum bits.

The processor 112 can transmit the control signals 130 while the software service 108 is running to provide runtime control over the service 108. This may cause the computing operation 110 to produce a different result than may otherwise be produced absent the control signals 130, because the computing operation's result is dependent on the states of the quantum bits to which the bias amounts are applied. In this way, the results of the computing operation's results may be dynamically influenced in response to events detected by the event detector 106. Thus, the same inputs to the computing operation 110 may yield different results depending on the events occurring prior to each iteration of the computing operation 110.

As noted above, applying the biases to the quantum bits can influence the results of the computing operation 110 in a various way, for example such that the computing operation 110 is more likely generate a target result. One such example may occur within the context of a navigation service. In that context, the processor 112 may detect an event 138 (e.g., via the event detector 106) involving a car accident on a highway. In response to detecting the event 138, the processor 112 may determine an amount of bias to apply to one or more quantum bits. The processor 112 may determine the amount of bias and the particular quantum bits using the mapping 128 or the model 136. The amount of bias and the quantum bits may be configured to influence the result of a computing operation 110, such as a redirection function, of the navigation service. For example, the amount of bias and the quantum bits selected by the processor 112 may be configured to cause the navigation service to redirect the driver around the car accident using a preferred secondary route, rather than a default secondary route. In this way, the system 100 can be said to bias the computing operation 110 toward a desired result.

Another example may occur within the context of an access control service. In one such example, the processor 112 may detect an event 138 (e.g., via the event detector 106) involving an intrusion attempt from a particular network address. In response to detecting the event 138, the processor 112 may determine an amount of bias to apply to one or more quantum bits. The amount of bias and the quantum bits may be configured to influence the result of a computing operation 110, such as an access control function, of the access control service. For example, the amount of bias and the quantum bits selected by the processor 112 may be configured to cause the access control service to reject all login attempts from that particular network address, rather than follow a default authentication process.

The system can also be used to bias the computing operation 110 away from an undesirable result. For example, in the navigation example described above, the amount of bias and the quantum bits selected by the processor 112 (e.g., using the mapping 128 or the model 136) may be configured to cause the navigation service to direct the driver along any route that excludes the car accident. In this way, the system 100 can be said to bias the computing operation 110 away from routes involving the car accident, rather than toward any specific route. As another example, the software service 108 may be a virus scanner usable for cybersecurity purposes. In one such example, the amount of bias and the quantum bits may be configured to cause the virus scanner to prevent a user from accessing an infected file. In this way, the system 100 can be said to bias the computing operation 110 away from the infected file, rather than toward any specific file.

Although FIG. 1 shows a certain number and combination of components, this is intended to be illustrative and non-limiting. Other examples may include more components, fewer components, different components, or a different arrangement of the components than is shown in FIG. 1. For instance, although the quantum computing subsystem 116 is shown as being separate from the computer 102 in FIG. 1, in other examples the quantum computing subsystem 116 can be part of the computer 102.

Figure 3:
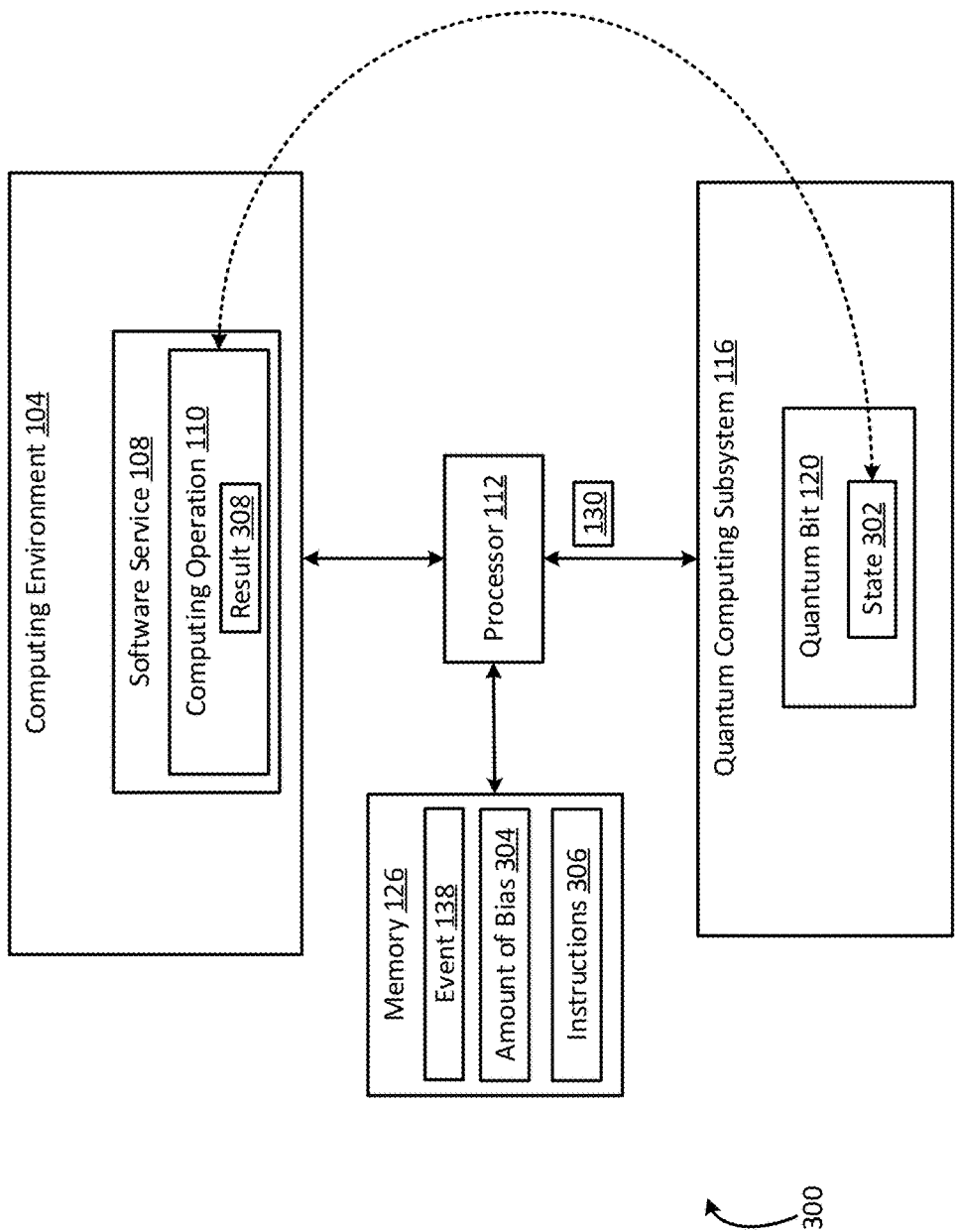
FIG. 3 is a block diagram of an example of a system for implementing some aspects of the present disclosure.

FIG. 3 is a block diagram of an example of a system 300 for implementing some aspects of the present disclosure. The system 300 includes a processor 112 communicatively coupled to a memory 126. The processor 112 can execute instructions 306 stored in memory 126 to perform operations. In some examples, the instructions 306 may include the event detector 106 of FIG. 1. The instructions 306 can enable the processor 112 to perform some or all of the functionality described herein.

For example, the processor 112 can detect an event 138 related to a service 108 executing in a computing environment 104. The service 108 can be configured to rely on a state 302 of a quantum bit 120 of a quantum computing subsystem 116 in performing a computing operation 110. This reliance is depicted in FIG. 2 via a dashed arrow. Next, the processor 112 can determine an amount of bias 304 to apply to the quantum bit 120 based on the event 138, for example using a mapping or a model. The amount of bias 304 can be configured to modify a result 308 of the computing operation 110. The processor 112 can then transmit a control signal 130 configured to cause the quantum computing subsystem 116 to apply the amount of bias 304 to the quantum bit 120. The bias 304 can be applied while the service 108 is executing in the computing environment 104.

Figure 4:
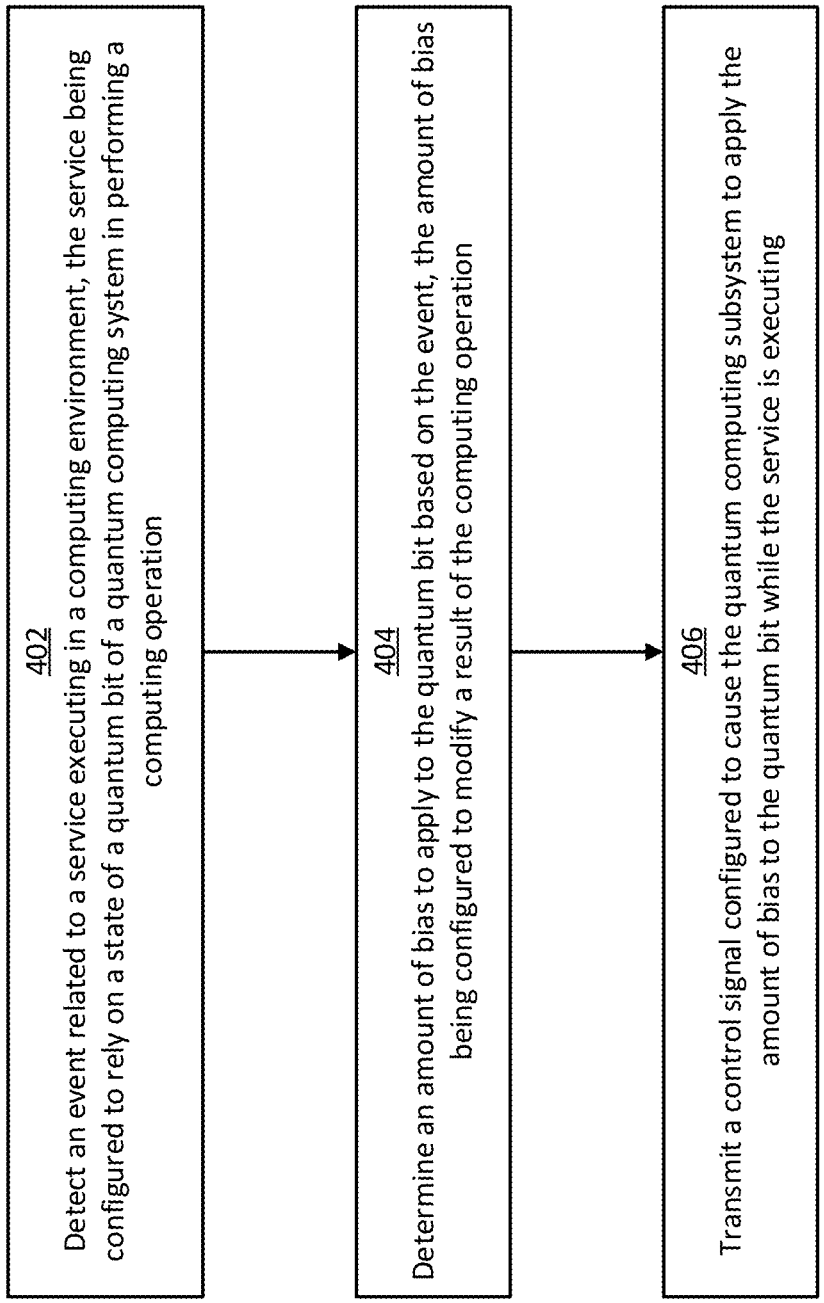
FIG. 4 is a flow chart of an example of a process for dynamically adjusting biases on quantum bits in response to detecting events according to some aspects of the present disclosure.

FIG. 4 is a flow chart of an example of a process for dynamically adjusting biases on quantum bits in response to detected events according to some aspects of the present disclosure. Other examples may include more operations, fewer operations different operations, or a different order of the operations than is shown in FIG. 4. The operations of FIG. 4 are described below with reference to the components of FIGS. 1-3 above.

In block 402, the processor 112 detects an event 138 related to a software service 108 executing in a computing environment 104. The software service 108 can be configured to rely on a state 302 of a quantum bit 120 of a quantum computing subsystem 116 in performing a computing operation 110. The processor 112 may detect the event 138 by executing an event detector 106.

In block 404, the processor 112 determines an amount of bias 304 to apply to the quantum bit 120 based on the event 138. For example, the processor 112 may apply a mapping 128 or a model 136 to determine the amount of bias 304 to apply. The amount of bias 304 can be configured to modify a result 308 of the computing operation 110.

In some examples, the processor 112 also determines a quantum bit 120 to which to apply the amount of bias 304. For example, the processor 112 may apply the mapping 128 or the model 136 to determine the quantum bit 120 to which to apply the amount of bias 304.

In block 406, the processor 112 transmits a control signal 130 configured to cause the quantum computing subsystem 116 to apply the amount of bias 304 to the quantum bit 120. The bias 304 can be applied while the software service 108 is executing in the computing environment 104. The processor 112 may generate the control signal based on the amount of bias 304, the quantum bit 120, or both determined in block 404.

Figure 5:
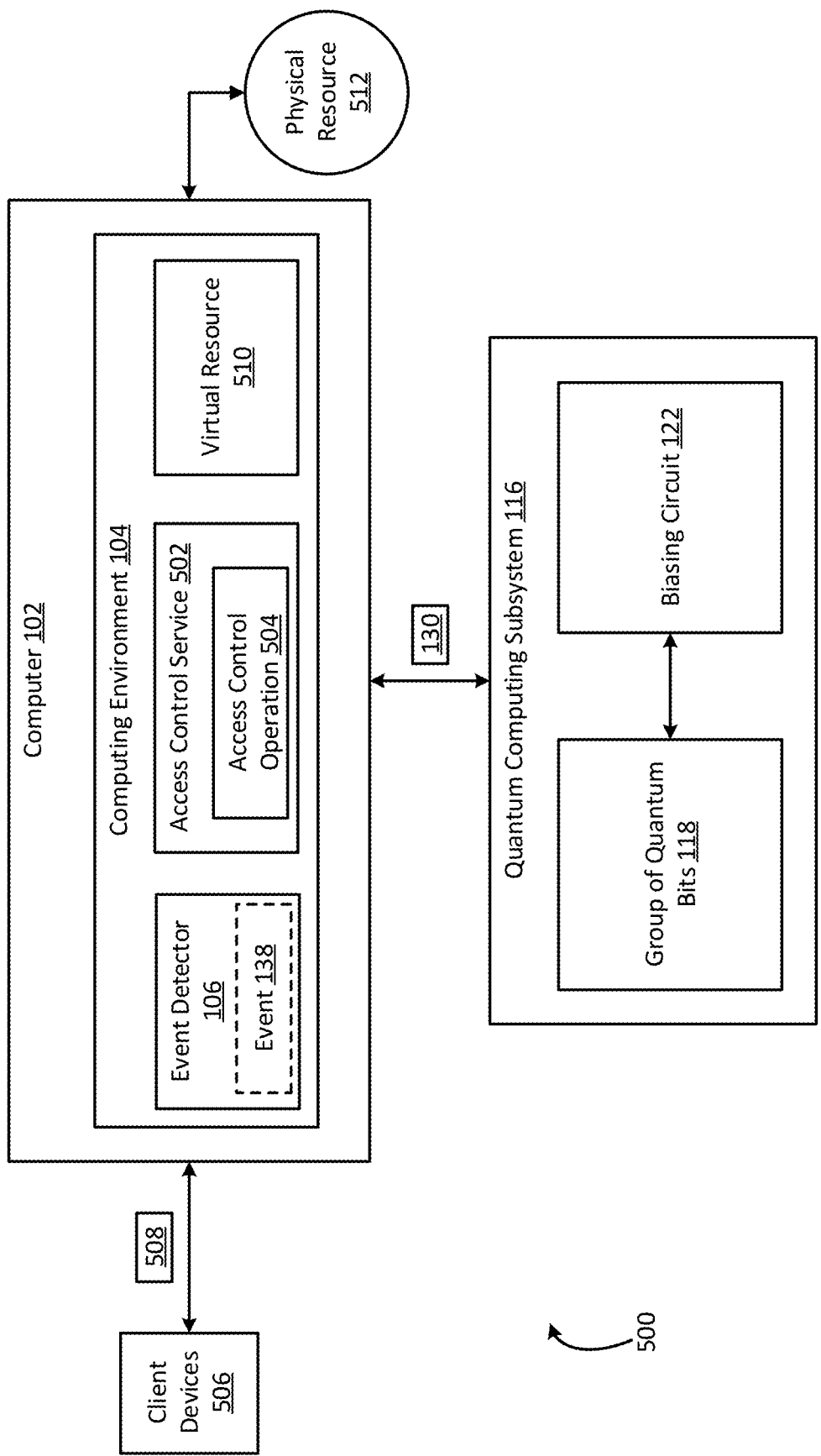
FIG. 5 is a block diagram of an example of a system for controlling access to a resource by dynamically adjusting biases on quantum bits according to some aspects of the present disclosure.

FIG. 5 is a block diagram of an example of a system 500 for controlling access to a resource by dynamically adjusting biases on quantum bits according to some aspects of the present disclosure. The system 500 includes a computer 102 that may have similar components to those described above with respect to FIG. 1. For example, the computer 102 can include the processor 112, memory 126, mapping 128, model 136, quantum interface 114, or any combination of these, described above. Many of those components have been intentionally omitted from FIG. 5 for simplicity.

The computer 102 can be communicatively coupled to a quantum computing subsystem 116, which may also have similar components to those described above with respect to FIG. 1. For example, the group 118 of quantum bits can include quantum bits 120a-n and the biasing circuit 122 can include the biasing devices 124a-n. Many of those components have been intentionally omitted from FIG. 5 for simplicity.

In this example, the system 500 is an access control system and the service is an access control service 502. The access control service 502 can control access to one or more resources, such as a virtual resource 510 or a physical resource 512. Examples of the virtual resource 510 may be a secure website or a secure program. Examples of the physical resource 512 may be a secure building or a secure piece of equipment.

The computer 102 can receive access control requests 508 from one or more client devices 506 or users. The access control requests 508 may be received directly or they may be received indirectly via a network, such as a local area network or the Internet. The access control requests 508 can be for obtaining access to the one or more resources. The computer 102 can provide the access control requests 508 to the access control service 502, which can execute an access control operation 504 to adjudicate the access control requests 508. In particular, the access control service 502 can execute the access control operation 504 to determine whether to approve or deny an access control request 508.

In some examples, the computer 102 may detect events and dynamically adjust biases on quantum bits in response to the events. These adjustments may influence results from the access control operation 504. For example, the computer 102 may detect an event 138 using the event detector 106. In response to detecting the event, the computer 102 can determine an amount of bias and a quantum bit (within the group 118 of quantum bits) to which to apply the amount of bias. The computer 102 may make this determination using the mapping 128, the model 136, or both as described above. The computer 102 may then generate and transmit one or more control signals 130 configured to cause the quantum computing subsystem 116 to apply the determined amount of bias to the determined quantum bit. More specifically, the quantum computing subsystem 116 may operate the biasing circuit 122 to apply the determined amount of bias to the determined quantum bit. This may impact how the access control operation 504 is performed and, consequently, influence a result from the access control operation 504. Through this process, two access control requests submitted by the same client device or the same user for the same resource, at two different instants in time, may be treated in different ways by the access control service 502 depending on the events occurring between the two requests.

In some aspects, biases on quantum bits can be dynamically adjusted based on detected events according to one or more of the following examples. As used below, any reference to a series of examples is to be understood as a reference to each of those examples disjunctively (e.g., "Examples 1-4" is to be understood as "Examples 1, 2, 3, or 4").

Example #1: A non-transitory computer-readable medium of the present disclosure can include program code that is executable by a processor for causing the processor to: detect an event related to a service executing in a computing environment, the service being configured to rely on a state of a quantum bit of a quantum computing subsystem in performing a computing operation; determine an amount of bias to apply to the quantum bit based on the event, the amount of bias being configured to modify a result of the computing operation; and transmit a control signal configured to cause the quantum computing subsystem to apply the amount of bias to the quantum bit while the service is executing.

Example #2: The non-transitory computer-readable medium of Example #1, wherein the service is configured to generate a first result for the computing operation prior to the amount of bias being applied to the quantum bit, and wherein the service is configured to generate a second result for the computing operation subsequent to the amount of bias being applied to the quantum bit, the second result being different from the first result.

Example #3: The non-transitory computer-readable medium of any of Examples #1-2, further comprising program code that is executable by the processor for causing the processor to: access a predefined mapping that correlates a plurality of events to a plurality of bias amounts to apply to one or more quantum bits, wherein the predefined mapping includes a correlation between the event and the amount of bias to apply to the quantum bit; determine the amount of bias to apply to the quantum bit based on the correlation in the predefined mapping; and generate the control signal based on the amount of bias.

Example #4: The non-transitory computer-readable medium of Example #3, wherein the predefined mapping further correlates the plurality of bias amounts to a plurality of quantum bits of the quantum computing subsystem, wherein the predefined mapping includes a relationship between the amount of bias and the quantum bit, and further comprising program code that is executable by the processor for causing the processor to: select the quantum bit, from among the plurality of quantum bits, based on the relationship in the predefined mapping; and based on selecting the quantum bit, generate the control signal to include an indicator of the quantum bit.

Example #5: The non-transitory computer-readable medium of any of Examples #1-4, further comprising program code that is executable by the processor for causing the processor to: determine a plurality of bias amounts to apply to a plurality of quantum bits based on the event; and transmit one or more control signals for causing the quantum computing subsystem to apply the plurality of bias amounts to the plurality of quantum bits while the service is executing.

Example #6: The non-transitory computer-readable medium of any of Examples #1-5, wherein the service is an access control system for controlling access to a resource, and the computing operation is an authorization operation for approving or denying a request from a client device to access the resource.

Example #7: The non-transitory computer-readable medium of any of Examples #1-6, wherein the event is external to the service.

Example #8: The non-transitory computer-readable medium of Example #7, wherein the event is a virtual event occurring in the computing environment or another computing environment.

Example #9: The non-transitory computer-readable medium of Example #7, wherein the event is a physical event occurring in real space.

Example #10: The non-transitory computer-readable medium of any of Examples #1-6, wherein the event is internal to the service.

Example #11: A method of the present disclosure can include detecting an event related to a service executing in a computing environment, the service being configured to rely on a state of a quantum bit of a quantum computing subsystem in performing a computing operation; determining an amount of bias to apply to the quantum bit based on the event, the amount of bias being configured to modify a result of the computing operation; and transmitting a control signal configured to cause the quantum computing subsystem to apply the amount of bias to the quantum bit while the service is executing. Some or all of the method can be performed by a computer.

Example #12: The method of claim of Example #11, wherein the service is configured to generate a first result for the computing operation prior to the amount of bias being applied to the quantum bit, and wherein the service is configured to generate a second result for the computing operation subsequent to the amount of bias being applied to the quantum bit, the second result being different from the first result.

Example #13: The method of any of Examples #11-12, further comprising: accessing a predefined mapping that correlates a plurality of events to a plurality of bias amounts to apply to one or more quantum bits, wherein the predefined mapping includes a correlation between the event and the amount of bias to apply to the quantum bit; determining the amount of bias to apply to the quantum bit based on the correlation in the predefined mapping; and generating the control signal based on the amount of bias.

Example #14: The method of Example #13, wherein the predefined mapping further correlates the plurality of bias amounts to a plurality of quantum bits of the quantum computing subsystem, wherein the predefined mapping includes a relationship between the amount of bias and the quantum bit, and further comprising: selecting the quantum bit, from among the plurality of quantum bits, based on the relationship in the predefined mapping; and based on selecting the quantum bit, generating the control signal to include an indicator of the quantum bit.

Example #15: The method of any of Examples #11-14, further comprising: determining a plurality of bias amounts to apply to a plurality of quantum bits based on the event; and transmitting one or more control signals for causing the quantum computing subsystem to apply the plurality of bias amounts to the plurality of quantum bits while the service is executing.

Example #16: The method of any of Examples #11-15, wherein the service is an access control system for controlling access to a resource, and the computing operation is an authorization operation for approving or denying a request from a client device to access the resource.

Example #17: The method of any of Examples #11-16, wherein the event is external to the service.

Example #18: The method of Example #17, wherein the event is a virtual event occurring in the computing environment or another computing environment.

Example #19: The method of Example #17, wherein the event is a physical event occurring in real space.

Example #20: A system of the present disclosure can include a processor communicatively coupled to a quantum computing subsystem; and a memory including instructions that are executable by the processor for causing the processor to: detect an event related to a service executing in a computing environment, the service being configured to rely on a state of a quantum bit of the quantum computing subsystem in performing a computing operation; determine an amount of bias to apply to the quantum bit based on the event, the amount of bias being configured to modify a result of the computing operation; and transmit a control signal configured to cause the quantum computing subsystem to apply the amount of bias to the quantum bit while the service is executing.

Example #21: A system of the present disclosure can include a quantum computing subsystem including: a plurality of quantum bits; and a biasing circuit configured to apply a plurality of biases to the plurality of quantum bits. The system can further comprise a processor communicatively coupled to the quantum computing subsystem; and a memory including instructions that are executable by the processor for causing the processor to: detect an event related to a service executing in a computing environment, the service being configured to rely on a state of a quantum bit of the plurality of quantum bits in performing a computing operation; determine an amount of bias to apply to the quantum bit based on the event, the amount of bias being configured to modify a result of the computing operation; and transmit a control signal configured to cause the quantum computing subsystem to apply the amount of bias to the quantum bit while the service is executing.

Example #22: The system of Example #21, wherein the service is configured to generate a first result for the computing operation prior to the amount of bias being applied to the quantum bit, and wherein the service is configured to generate a second result for the computing operation subsequent to the amount of bias being applied to the quantum bit, the second result being different from the first result.

Example #23: The system of any of Examples #21-22, wherein the memory further includes instructions that are executable by the processor for causing the processor to: access a predefined mapping that correlates a plurality of events to a plurality of bias amounts to apply to one or more quantum bits, wherein the predefined mapping includes a correlation between the event and the amount of bias to apply to the quantum bit; determine the amount of bias to apply to the quantum bit based on the correlation in the predefined mapping; and generate the control signal based on the amount of bias.

Example #24: The system of any of Example #23, wherein the predefined mapping further correlates the plurality of bias amounts to the plurality of quantum bits of the quantum computing subsystem, wherein the predefined mapping includes a relationship between the amount of bias and the quantum bit, and wherein the memory further comprises instructions that are executable by the processor for causing the processor to: select the quantum bit, from among the plurality of quantum bits, based on the relationship in the predefined mapping; and based on selecting the quantum bit, generate the control signal to include an indicator of the quantum bit.

Example #25: The system of any of Examples #21-24, wherein the memory further comprises instructions that are executable by the processor for causing the processor to: determine a plurality of bias amounts to apply to the plurality of quantum bits based on the event; and transmit one or more control signals for causing the quantum computing subsystem to apply the plurality of bias amounts to the plurality of quantum bits while the service is executing.

Example #26: The system of any of Examples #21-25, wherein the service is an access control system for controlling access to a resource, and the computing operation is an authorization operation for approving or denying a request from a client device to access the resource.

Example #27: The system of any of Examples #21-26, wherein the event is external to the service.

Example #28: The system of Example #27, wherein the event is a virtual event occurring in the computing environment or another computing environment.

Example #29: The system of Example #27, wherein the event is a physical event occurring in real space.

Example #30: The system of any of Examples #21-26, wherein the event is internal to the service.

Example #31: An access control system of the present disclosure can include a processor communicatively coupled to a quantum computing subsystem; and a memory including instructions that are executable by the processor for causing the processor to: detect an event relating to an access control service executing in a computing environment, the access control service being configured to rely on a state of a quantum bit of the quantum computing subsystem in performing an access control operation; determine an amount of bias to apply to the quantum bit based on the event, the amount of bias being configured to modify a result of the access control operation; and transmit a control signal configured to cause the quantum computing subsystem to apply the amount of bias to the quantum bit while the access control service is executing.

Example #32: The access control system of Example #31, wherein the memory further includes instructions that are executable by the processor for causing the processor to, prior to transmitting the control signal: receive a first access control request from a user, the first access control request being for accessing a resource; and provide the first access control request as input to the access control service, the access control service being configured to perform the access control operation based on a first state of the quantum bit and thereby generate a first response to the first access control request. The instructions are further executable by the processor for causing the processor to, subsequent to transmitting the control signal: receive a second access control request from the user, the second access control request being for accessing the resource; and provide the second access control request as input to the access control service, the access control service being configured to perform the access control operation based on a second state of the quantum bit and thereby generate a second response to the second access control request, the second state being different from the first state, and the second response being different from the first response.

Example #33: The access control system of Example #32, wherein the resource is a computing resource associated with the computing environment.

Example #34: The access control system of Example #32, wherein the resource is a physical resource that is external to the computing environment and located in real space.

Example #35: A system of the present disclosure can include means for detecting an event related to a service executing in a computing environment, the service being configured to rely on a state of a quantum bit of a quantum computing subsystem in performing a computing operation; means for determining an amount of bias to apply to the quantum bit based on the event; and means for transmitting a control signal configured to cause the amount of bias to be applied to the quantum bit while the service is executing for modifying a result of the computing operation.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, any example described herein can be combined with any other examples to yield further examples.

The invention claimed is:

1. A non-transitory computer-readable medium comprising program code that is executable by a processor for causing the processor to:
    detect an event related to a service executing in a computing environment, the service being configured to rely on a state of a quantum bit of a quantum computing subsystem in performing a computing operation, wherein the event is a physical event occurring in real space or the event is internal to the service;
    determine an amount of bias to apply to the quantum bit based on the event, the amount of bias being configured to modify a result of the computing operation; and
    transmit a control signal configured to cause the quantum computing subsystem to apply the amount of bias to the quantum bit while the service is executing.

2. The non-transitory computer-readable medium of claim 1, wherein the service is configured to generate a first result for the computing operation prior to the amount of bias being applied to the quantum bit, and wherein the service is configured to generate a second result for the computing operation subsequent to the amount of bias being applied to the quantum bit, the second result being different from the first result.

3. The non-transitory computer-readable medium of claim 1, further comprising program code that is executable by the processor for causing the processor to:
    access a predefined mapping that correlates a plurality of events to a plurality of bias amounts to apply to one or more quantum bits, wherein the predefined mapping includes a correlation between the event and the amount of bias to apply to the quantum bit;
    determine the amount of bias to apply to the quantum bit based on the correlation in the predefined mapping; and
    generate the control signal based on the amount of bias.

4. The non-transitory computer-readable medium of claim 3, wherein the predefined mapping further correlates the plurality of bias amounts to a plurality of quantum bits of the quantum computing subsystem, wherein the predefined mapping includes a relationship between the amount of bias and the quantum bit, and further comprising program code that is executable by the processor for causing the processor to:
    select the quantum bit, from among the plurality of quantum bits, based on the relationship in the predefined mapping; and
    based on selecting the quantum bit, generate the control signal to include an indicator of the quantum bit.

5. The non-transitory computer-readable medium of claim 1, further comprising program code that is executable by the processor for causing the processor to:
    determine a plurality of bias amounts to apply to a plurality of quantum bits based on the event; and
    transmit one or more control signals for causing the quantum computing subsystem to apply the plurality of bias amounts to the plurality of quantum bits while the service is executing.

6. The non-transitory computer-readable medium of claim 1, wherein the service is an access control system for controlling access to a resource, and the computing operation is an authorization operation for approving or denying a request from a client device to access the resource.

7. A method comprising:
    detecting, by a computer, an event related to a service executing in a computing environment, the service being configured to rely on a state of a quantum bit of a quantum computing subsystem in performing a computing operation;
    determining, by the computer, an amount of bias to apply to the quantum bit based on the event, the amount of bias being configured to modify a result of the computing operation, wherein the amount of bias is determined by:
        accessing a predefined mapping that correlates a plurality of events to a plurality of bias amounts to apply to one or more quantum bits, wherein the predefined mapping includes a correlation between the event and the amount of bias to apply to the quantum bit; and
        determining the amount of bias to apply to the quantum bit based on the correlation in the predefined mapping;
    generating, by the computer, a control signal based on the amount of bias; and
    transmitting, by the computer, the control signal to the quantum computing system, wherein the quantum computing subsystem responds to the control signal by applying the amount of bias to the quantum bit while the service is executing.

8. The method of claim 7, wherein the service is configured to generate a first result for the computing operation prior to the amount of bias being applied to the quantum bit, and wherein the service is configured to generate a second result for the computing operation subsequent to the amount of bias being applied to the quantum bit, the second result being different from the first result.

9. The method of claim 7, wherein the predefined mapping further correlates the plurality of bias amounts to a plurality of quantum bits of the quantum computing subsystem, wherein the predefined mapping includes a relationship between the amount of bias and the quantum bit, and further comprising:
    selecting the quantum bit, from among the plurality of quantum bits, based on the relationship in the predefined mapping; and
    based on selecting the quantum bit, generating the control signal to include an indicator of the quantum bit.

10. The method of claim 7, further comprising:
    determining a set of bias amounts to apply to a set of quantum bits based on the event; and
    transmitting one or more control signals for causing the quantum computing subsystem to apply the set of bias amounts to the set of quantum bits while the service is executing.

11. The method of claim 7, wherein the service is an access control system for controlling access to a resource, and the computing operation is an authorization operation for approving or denying a request from a client device to access the resource.

12. The method of claim 7, wherein the event is external to the service.

13. The method of claim 12, wherein the event is a virtual event occurring in the computing environment or another computing environment.

14. The method of claim 12, wherein the event is a physical event occurring in real space.

15. A system comprising:
    a processor communicatively coupled to a quantum computing subsystem; and
    a memory including instructions that are executable by the processor for causing the processor to:
        detect an event related to a service executing in a computing environment, the service being configured to rely on a state of a quantum bit of the quantum computing subsystem in performing a computing operation, wherein the service is an access control service for controlling access to a resource, and wherein the computing operation is an authorization operation for approving or denying a request from a client device to access the resource;
        determine an amount of bias to apply to the quantum bit based on the event, the amount of bias being configured to modify a result of the computing operation; and
        transmit a control signal configured to cause the quantum computing subsystem to apply the amount of bias to the quantum bit while the service is executing.

16. The system of claim 15, wherein the service is configured to generate a first result for the computing operation prior to the amount of bias being applied to the quantum bit, and wherein the service is configured to generate a second result for the computing operation subsequent to the amount of bias being applied to the quantum bit, the second result being different from the first result.

17. The system of claim 15, wherein the memory further includes instructions that are executable by the processor for causing the processor to:
    access a predefined mapping that correlates a plurality of events to a plurality of bias amounts to apply to one or more quantum bits, wherein the predefined mapping includes a correlation between the event and the amount of bias to apply to the quantum bit;
    determine the amount of bias to apply to the quantum bit based on the correlation in the predefined mapping; and
    generate the control signal based on the amount of bias.

18. The system of claim 15, wherein the event is a physical event occurring in real space.

19. The system of claim 15, wherein the event is internal to the service.

20. The system of claim 15, wherein the memory further includes instructions that are executable by the processor for causing the processor to:

determine a plurality of bias amounts to apply to a plurality of quantum bits based on the event; and transmit one or more control signals for causing the quantum computing subsystem to apply the plurality of bias amounts to the plurality of quantum bits while the service is executing.

* * * * *